Oct. 16, 1962  C. ROBERTSON  3,059,116
PHOTOELECTRIC SAMPLING SWITCH
Filed Sept. 8, 1959  2 Sheets-Sheet 1

INVENTOR.
CARTER ROBERTSON
BY
*George C. Sullivan*
Agent

Oct. 16, 1962 C. ROBERTSON 3,059,116
PHOTOELECTRIC SAMPLING SWITCH
Filed Sept. 8, 1959 2 Sheets-Sheet 2
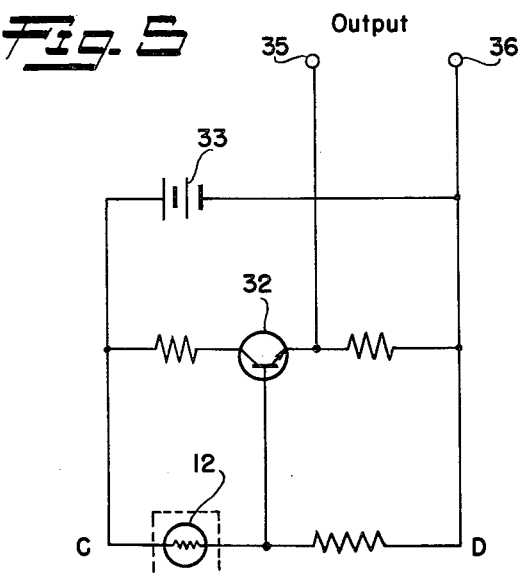
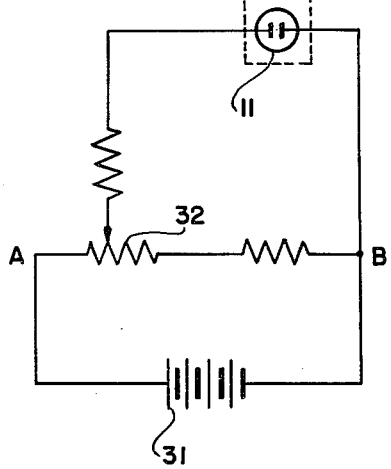
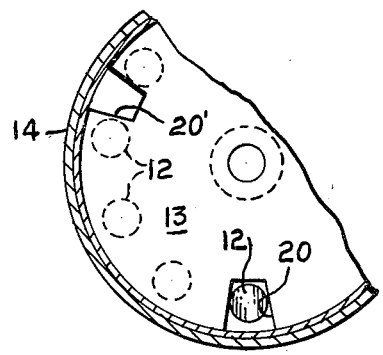
INVENTOR.
CARTER ROBERTSON
BY
George A. Sullivan
Agent

United States Patent Office

3,059,116
Patented Oct. 16, 1962

3,059,116
PHOTOELECTRIC SAMPLING SWITCH
Carter Robertson, Reseda, Calif., assignor to Lockheed Aircraft Corporation, Burbank, Calif.
Filed Sept. 8, 1959, Ser. No. 838,774
2 Claims. (Cl. 250—209)

The present invention relates ot a sampling switch which permits sampling of the condition of a series of separate circuits in sequence so that a single channel may transmit to a distant point information from the many separate circuits. More particularly, it relates to a sampling switch for the said purpose which uses photoelectric means to sense the condiitons of a series of circuits.

One prior method of a sampling switch involved a mechanical device wherein there were a series of contacts arranged in a line or a circle over which there moved a wiper arm taking a sample of each circuit in sequence. The physical contact meant that there was considerable wear, resulting in short life. When purity of signal transfer was important, it was found that the arcing of initial contact of the switch elements gave an erroneous signal. Furthermore, it caused pitting of the contact and wiper arm, multiplying the error. Dust has been found to materially affect the signal. The mechanical type was also susceptible to malfunction under vibration shock and acceleration.

Another prior sampling device involved the use of electronic circuits which had the purpose of overcoming the malfunction problem resulting from vibration shock arcing and acceleration. The electronic sampling switch using transistors or vacuum tubes was found to be expensive.

Another prior sampling switch involved a series of switch pairs, one element of which was flexible, located in a cylinder with a jet of air rotating from one to the next, deflecting the flexible element of each pair to make contact. The obvious disadvantage of this is that a source of air pressure must be supplied. Secondly, the disadvantages of mechanical contacts are not overcome.

It is an important object of this invention to provide a sampling switch which senses and transmits a signal of high reliability. The signal in the circuit to be sensed is converted to light and the light then sensed by photoelectric means, permitting fine graduations in the character of the signal.

It is another object of this invention to provide a sampling switch having a long life. Mechanical switch contacts are not used, which eliminates frictional wear.

It is another object of this invention to provide a sampling switch which is low in cost.

Further objects and advantages of this invention will become apparent from a reading of the specification and claims which follow, especially when taken in conjunction with the appended drawings.

FIG. 5 shows a representative circuit in which the present invention might be used.

FIG. 6 is a view similar to FIG. 4 of another embodiment of the invention.

Figure 1:
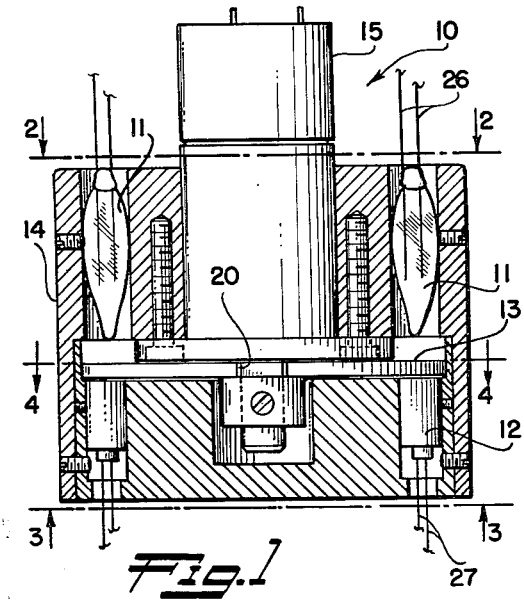
FIG. 1 is a view partially in section of the sampling switch showing signal transfer pairs and the motor which operates the scanning disk.

The sampling switch according to the present invention is shown in FIG. 1. The essential elements include a series of signal transfer pairs, each of which is comprised of a lamp 11 and a photocell 12. Each lamp 11 is a part of a separate circuit and produces a light directly proportional to the condition of its circuit. The light from the lamp 11 of each pair falls upon the related photocell 12. The photocell 12 produces electricity directly proportional to the amount of light falling upon it, which electricity may be amplified and used to excite an oscillator in a telemetering system.

Figure 4:
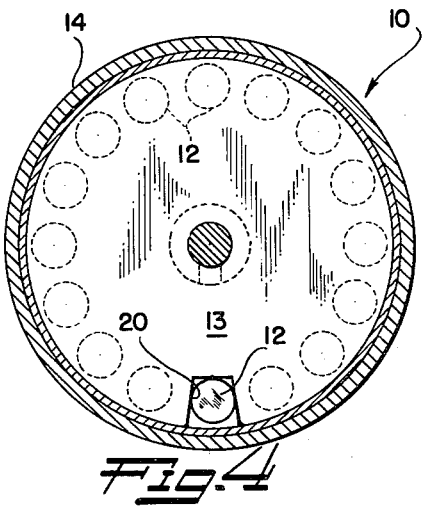
FIG. 4 is a view of the scanning disk.
Figure 2:
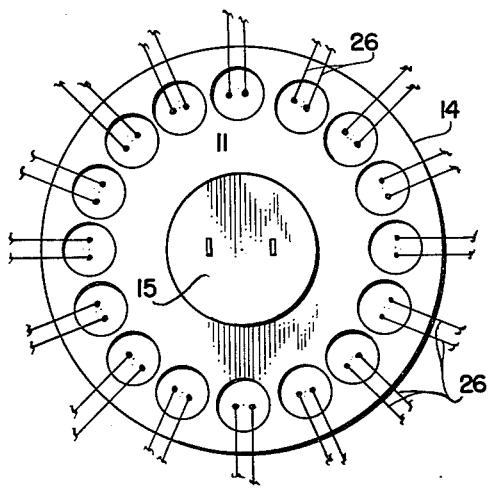
FIG. 2 is a plan view of the sampling switch taken on lines 2—2 of FIG. 1.
Figure 3:
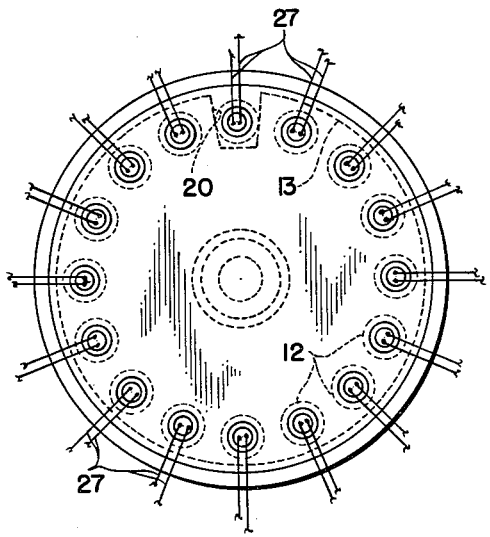
FIG. 3 is a view taken on lines 3—3 of FIG. 1.

In a telemetering system, a series of signals from many different sources are sampled and then transmitted on a single channel, the purpose being to save necessity of duplication of several components. The cells on the single channel may be separated through an appropriate synchronizing system, thus enabling reading of many separate circuits simultaneously at a distant place. In order that one circuit at a time be sampled, there are means provided to restrict signal transfer to one pair at a time. This means is rotating disk 13 which has an aperture 20 adjacent its edge as can be seen in FIG. 4. The disk 13 has an aperture 23 at its center which fits on shaft 22 of motor 15 which rotates it. The aperture 20 passes in sequence from one signal pair to the next, permitting transfer of a signal from lamp 11 to photocell 12, one at a time.

Each of the lamps 11 has a lead 26 to its respective circuit which it will sample and each of the photocells has a lead 27 to the telemetering system.

By use of a photo duo-diode which has a very quick response such as the Texas Instruments 1N2175, the rate of sampling may be increased. The photo duo-diode does not produce electricity but acts as a resistor increasing its resistance in proportion to the amount of light which falls upon it. By placing it in a circuit in which an electrical current is flowing, it will act somewhat as a potentiometer and vary the current flow depending on the intensity of the light contacting the photo duo-diode.

A typical circuit with which the sampling switch utilizing a photo duo-diode may be used is shown in FIG. 5. The couplng 30 between the lamp 11 and the photo duo-diode 12 is shown on dotted lines. The input is shown in this example as a single channel. Other channels are connected across the points A, B in parallel. The output is a single channel with other photo duo-diodes 12 being connected across C, D in parallel. An appropriate source of electrical power for the input channel is shown here as battery 31. The means by which the condition of the input circuit is altered is shown as potentiometer 32. Its mechanical position may be varied by appropriate means to alter the intensity of the light emitted by the lamp 11. Thus, it can be seen that a mechanical position of any device can be sensed by the potentiometer 32 and remotely indicated.

The signal passed by a sensitive photo duo-diode is small and must be amplified. The output channel is an amplifier circuit which includes transistor 32. The power for the output channel is supplied by battery 33 which biases the transistor 32 so that a signal passed by photo duo-diode 12 will cause transistor 32 to fire, amplifying the small current from the photo duo-diode 12. The output across poles 35—36 may then be used to drive an oscillator of a radio transmitter or recorded for future analysis.

Inherent in any light responsive device such as the photocell or the photo duo-diode as suggested herein is a rise time and a fall time; the rise time being the time required for the photo current to rise to the value proportional to the amount of light falling upon it and the fall time, the time for the photo current to decay from that value to zero when the light is removed. The relation between the rise and fall time to that of the period during which the photo duo-diode is at full value is usually expressed as a percentage. If it is found that the percentage of the rise and fall time is greater than desired, then a wider aperture 20 may be used which will obviously increase the relative period of time during which the photo duo-diode it at full value. This will necessitate spacing of the signal transfer pairs a greater distance from each other.

In some instances when it is found impracticable to rotate the sampling disk 13 at a greater speed in order to obtain a greater sampling rate, it is feasible to provide two or more apertures 20, 20' in the disk 13, as illustrated in FIGURE 6. This will necessitate a spacing of the signal transfer pairs in such a manner that only one aperture 20 is passing a signal at any moment, the other apertures falling between signal transfer pairs at that moment.

It can be seen that the present invention attains the objects as set forth herein. A photoelectric sampling switch has been disclosed which is an appreciable advancement in the art. It is to be understood that certain alterations, modifications and substitutions may be made to the instant disclosure without departing from the spirit and scope of this invention as defined in the appended claims. Having revealed the details of my invention, I claim the following combinations and their equivalents for which I am making application for a Letters Patent.

What is claimed is:

1. A photoelectric sampling switch comprised of a plurality of pairs of signal transfer means, each of said pairs comprised of means responsive to electricity to produce light, and means responsive to light to produce electricity spaced therefrom, said plurality of said pairs forming an endless line, each of said pairs being spaced from the other of said pairs so that the light produced by each of said means responsive to electricity to produce light influences only the said means responsive to light to produce electricity of its said pair, means interposed between said means responsive to electricity to produce light and means responsive to light to produce electricity of all of said pairs, an aperture in said means interposed so that when said aperture is adjacent one of said pairs, light from said means responsive to electricity will fall on said means responsive to light, means to move said means interposed so that said aperture moves from one pair to the next pair in sequence around said endless line of pairs of signal transfer means, means to apply an electrical potential to said means responsive to electricity to produce light, means to modulate said electrical potential and means to amplify said electricity produced by said means responsive to light to produce electricity.

2. A photoelectric sampling switch comprised of a plurality of pairs of signal transfer means, each of said pairs comprised of means responsive to electricity to produce light, and means responsive to light to produce electricity spaced therefrom, said plurality of said pairs forming an endless line, each of said pairs being spaced equidistant from adjacent of said pairs so that the light produced by each of said means responsive to electricity to produce light influences only the said means responsive to light to produce electricity of its said pair, means interposed between said means responsive to electricity to produce light and means responsive to light to produce electricity of all of said pairs, plural apertures narrower than the spacing between said pairs in said means interposed so that when one of said apertures is adjacent one of said pairs, light from said means responsive to electricity will fall upon said means responsive to light of its pair and the others of said apertures will fall between said signal transfer means, means to move said means interposed, means to apply an electrical potential to said means responsive to electricity to produce light, means to modulate said electrical potential and means to amplify said electricity produced by said means responsive to light to produce electricity.

References Cited in the file of this patent

UNITED STATES PATENTS

| | | |
|---|---|---|
| 2,192,761 | Underhill | Mar. 5, 1940 |
| 2,329,715 | Grier | Sept. 21, 1943 |
| 2,479,031 | Tait | Aug. 16, 1949 |
| 2,949,539 | Brown | Aug. 16, 1960 |